US012646004B2

(12) United States Patent
Sawarkar et al.

(10) Patent No.: US 12,646,004 B2
(45) Date of Patent: Jun. 2, 2026

(54) AUTOMATED FEATURE ENGINEERING

(71) Applicant: International Business Machines Corporation, Armonk, NY (US)

(72) Inventors: Kunal Sawarkar, Franklin Park, NJ (US); Shivam Raj Solanki, Austin, TX (US); Christopher Chen, San Jose, CA (US); Amit P. Joglekar, Olathe, KS (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 18/125,268

(22) Filed: Mar. 23, 2023

(65) Prior Publication Data

US 2024/0320565 A1     Sep. 26, 2024

(51) Int. Cl.
*G06N 20/10* (2019.01)

(52) U.S. Cl.
CPC ................................... *G06N 20/10* (2019.01)

(58) Field of Classification Search
CPC ...................................................... G06N 20/10
See application file for complete search history.

(56) References Cited

U.S. PATENT DOCUMENTS

| | | | |
|---|---|---|---|
| 7,546,236 B2 | 6/2009 | Stentiford | |
| 9,218,527 B2 | 12/2015 | Lakshminarayan | |
| 9,305,043 B2 | 4/2016 | Sakurai | |
| 9,614,742 B1 | 4/2017 | Zhang | |
| 9,928,155 B2 | 3/2018 | Xu | |
| 10,558,207 B1 * | 2/2020 | McGuirk | ........... G05B 23/0283 |
| 12,118,077 B2 * | 10/2024 | Manevitz | ............... G06F 17/18 |

(Continued)

FOREIGN PATENT DOCUMENTS

CN        112988815 A        6/2021

OTHER PUBLICATIONS

Ahmad, S., et al., "Unsupervised real-time anomaly detection for streaming data", Neurocomputing (2017), Revised Apr. 19, 2017, Accepted Apr. 22, 2017, Available online Jun. 2, 2017, pp. 134-147, vol. 262.

(Continued)

*Primary Examiner* — Barbara M Level
(74) *Attorney, Agent, or Firm* — Scully, Scott, Murphy & Presser, P.C.; Stosch Sabo

(57) ABSTRACT

Feature engineering, for example, in automated machine learning, can include receiving streaming data representing at least one attribute detected by a sensor over time. Long term point statistics associated with the streaming data can be computed. The streaming data can be quantized into intervals of time windows and short term point statistics based on the intervals can be computed. The long term point statistics and the short term point statistics can be normalized. Dynamic time warping can be applied across the normalized long term point statistics and short term point statistics. A pair of probability distributions can be generated associated with the dynamic time warped normalized long term point statistics and short term point statistics. Based on distance between the mean values of the probability distributions, machine learning input features can be produced. The machine learning input features can be fed to train a machine learning model for detecting anomaly.

19 Claims, 9 Drawing Sheets

(56) References Cited

U.S. PATENT DOCUMENTS

| 12,271,256 | B2 * | 4/2025 | Porter | ................. | G05B 23/024 |
| 2006/0294095 | A1 | 12/2006 | Berk | | |
| 2015/0199224 | A1 * | 7/2015 | Mihnev | .............. | G06F 11/0709 |
| | | | | | 714/37 |
| 2015/0269050 | A1 * | 9/2015 | Filimonov | ......... | G06Q 10/0639 |
| | | | | | 702/183 |
| 2017/0193372 | A1 * | 7/2017 | Schimert | .................. | G06N 5/04 |
| 2018/0330201 | A1 * | 11/2018 | Witbrock | .............. | G06N 20/10 |
| 2021/0027302 | A1 | 1/2021 | Resheff | | |
| 2021/0124983 | A1 * | 4/2021 | Axenie | .............. | H04L 63/1425 |

OTHER PUBLICATIONS

Ding, Z., et al., "An Anomaly Detection Approach Based on Isolation Forest Algorithm for Streaming Data using Sliding Window", 3rd IFAC International Conference on Intelligent Control and Automation Science, Sep. 2-4, 2013, pp. 12-17.
Hirschtein, A., "Real-Time Feature Engineering with a Feature store", https://towardsdatascience.com/real-time-feature-engineering-with-a-feature-store-2d51ce925734, Dec. 16, 2020, 10 pages.
IBM, "AutoML IBM AutoAI", https://www.ibm.com/cloud/watson-studio/autoai, Accessed on Mar. 23, 2023, 11 pages.

* cited by examiner

100

CLIENT COMPUTER 101

PROCESSOR SET 110

| PROCESSING CIRCUITRY 120 | CACHE 121 |
|---|---|

COMMUNICATION FABRIC 111

VOLATILE MEMORY 112

PERSISTENT STORAGE 113

OPERATING SYSTEM 122

FEATURE ENGINEERING

200

PERIPHERAL DEVICE SET 114

| UI DEVICE SET 123 | STORAGE 124 | IoT SENSOR SET 125 |
|---|---|---|

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

| CLOUD ORCHESTRATION MODULE 141 | HOT PHYSICAL MACHINE SET 142 |
|---|---|
| VIRTUAL MACHINE SET 143 | CONTAINER SET 144 |

FIG. 1

AUTOMATED FEATURE ENGINEERING

BACKGROUND

The present application relates generally to computers and computer applications, and more particularly to automated feature engineering for streaming data anomaly detection, for example, unsupervised anomaly detection of streaming data and/or dynamic heterogenous datasets.

BRIEF SUMMARY

The summary of the disclosure is given to aid understanding of a computer system and method of feature engineering, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A computer-implemented method, in an aspect, can include receiving streaming data. The streaming data can represent at least one attribute detected by a sensor over time. The method can also include computing long term point statistics associated with the streaming data of a first time duration. The method can also include quantizing the streaming data into intervals of time windows, the intervals of time windows being of shorter time duration than the first time duration, and computing short term point statistics based on the intervals of time windows. The method can also include normalizing the long term point statistics and the short term point statistics. The method can also include applying dynamic time warping across the normalized long term point statistics and short term point statistics. The method can also include generating a pair of probability distributions of the dynamic time warped normalized long term point statistics and short term point statistics. The method can also include, based on distance between mean values of the pair of probability distributions, producing machine learning input features. The method can also include feeding the machine learning input features to train a machine learning model for the machine learning model to detect anomalies in data streams.

A system, in an aspect, can include at least one processor. The system can also include at least one memory device coupled with at least one processor. At least one processor can be configured to receive streaming data. The streaming data can represent at least one attribute detected by a sensor over time. At least one processor can also be configured to compute long term point statistics associated with the streaming data of a first time duration. At least one processor can also be configured to quantize the streaming data into intervals of time windows, the intervals of time windows being of shorter time duration than the first time duration, and compute short term point statistics based on the intervals of time windows. At least one processor can also be configured to normalize the long term point statistics and the short term point statistics. At least one processor can also be configured to apply dynamic time warping across the normalized long term point statistics and short term point statistics. At least one processor can also be configured to generate a pair of probability distributions of the dynamic time warped normalized long term point statistics and short term point statistics. At least one processor can also be configured to, based on distance between mean values of the pair of probability distributions, produce machine learning input features. At least one processor can also be configured to feed the machine learning input features to train a machine learning model for the machine learning model to detect anomalies in data streams.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 1 shows an example of a computing environment, which can implement feature engineering in an embodiment.

DETAILED DESCRIPTION

Figure 2:
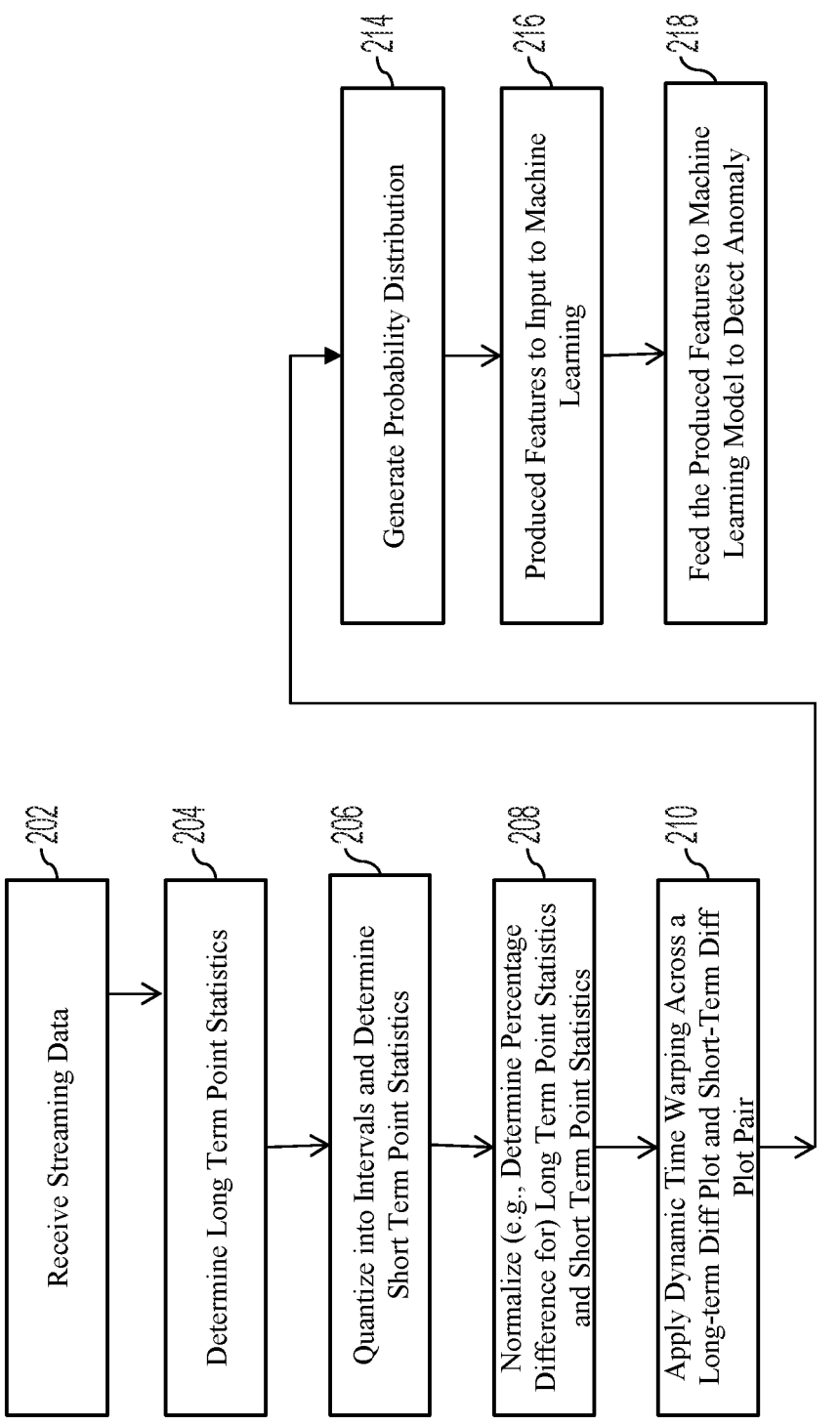
FIG. 2 is a flow diagram illustrating a method in an embodiment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as automatic feature engineering code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things (IoT) applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Referring to temporal data, the term "temporal" is used for any time-sensitive data. The use of the term timestamp can be varied: e.g., timestamp can refer to an expiry date of an item such as a grocery item; timestamp can also refer to a time-window, for example, a duration during which an item is on sale at a store. The "temporal sequences" are timestamped at regular or irregular time intervals, and are not necessarily associated with a real-value measurement. For example, the values can be symbols, images, categorical/discrete, and or others. The "time series" is a special case of temporal sequences with characteristics: regular intervals, and real-value measurements.

One or more embodiments of a technique disclosed herein deals with streaming data, for example, "temporal sequences of real-value measurements", which have the characteristics of: timestamps of regular or irregular time intervals, and are of real-value measurements.

Examples of streaming data can include data collected by IoT sensors such as health monitor sensors, as well as data not collected by IoT sensors like stock price charts, and/or others. In the description provided herein, refrigeration unit temperature sensors are used as an example. However, the technique described herein is not limited to only such sensor data, and can apply to or work with any streaming data.

A characteristic of streaming data is that there can be normal variations in the data. For example, refrigerator door is opened and closed, or coolant action depends on ambient temperature, resulting in variations or fluctuation. There can also be larger variations that are also considered normal, such as variations resulting from defrost cycles in refrigeration units.

Streaming data forms the backbone of modern industries. However, detection of patterns in such data to ensure failure prevention remains a challenge. One particular feature of such data is normal variations during the day with peaks and valley, which may or may not indicate an indication of upcoming failure. Performing anomaly detection on such time series can be a challenge. An automated feature engineering method and system can be provided, which can convert temporal data to point statistics, to enable anomaly detection by unsupervised contamination algorithms like isolation forests and/or One class SVM.

Streaming data is collected by industries for a variety of purposes. Different types of sensors, for example, ranging from health monitors to operational sensors on manufacturing units can each create a stream of sensor data. By way of example, consider an industrial refrigeration unit. Industrial refrigeration units are a backbone of many industries like, but not limited to, food, supermarkets, shipping, and healthcare. Industrial refrigeration units store a wide range of types of items, from foods to lifesaving medical supplies. Sensor streaming provides services to monitor these refrigeration units using Internet of Things (IoT) sensors that continually track the units for temperature, humidity, and other operating condition measurements, to ensure optimal operations. Using a business intelligence (BI) system, customers can set up threshold for refrigeration units and monitor the behavior by visualizing sensor data.

By way of example, healthcare and life sciences industry can employ such sensor systems datasets given their need for ensuring constant supply. Most of these refrigeration units contains liquid nitrogen maintained at ultra-low temperature and contains priceless cargo like frozen eggs, cancer research cells, vaccines, and/or others. Even a single failure in refrigeration unit or even a temperature fluctuation from typical operating temperature can cause enormous damage to years of research. For the customers of such sensor data, this can create severe loss of reputation to their consumer and substantial financial loss.

Continuing with the example of refrigeration units, industrial sensor data can be collected by placing IoT sensors on assets. Such sensors can provide data about temperatures of the refrigeration units as well as humidity, if door is closed or not, and other informational data. Currently the customers set their normal operating temperature range and a high-low threshold beyond which an alarm will be sounded. This system relies on hard configuration and is reactive in nature. By the time the alarm is sounded it may be already very late and the only option is to repair it.

Hence, for example, reactive anomaly detection may not be enough. For example, setting up an alert for high and low thresholds can be inefficient because there is less time to fix the issue, and the damage may be already done. However, proactive anomaly detection, for example, creating a system that can prevent failure and proactively alert the users is a challenge for streaming systems. For example, moving from current BI to artificial intelligence (AI) system can be a complex challenge and can involve solving a difficult machine learning problem.

In order to spot the failures before they happen, a system would need to detect the abnormalities in the asset behavior and flag that behavior in case it deviates from the normal expected pattern. However, doing so may not be easy. For example, defining "normality" versus "abnormality" can be a challenge. Temperature in refrigeration units can fluctuate, for example, for reasons that are normally or routinely operational. For example, if a user opens the door, if the outside weather is too hot, or if the unit is undergoing a defrost cycle, there can be peaks and valleys in the temperature data. In other words, temperature can always change and may even momentarily reach a threshold and come back to normal; but only in certain cases it may be a cause of concern. The problem is very similar to heart rate monitoring, e.g., where the heart rate may go up for any number of normal reasons (like running), but one would need to identify abnormal heart rate that is indicative of upcoming heart failure.

Another complication added to the ability of differentiating a normal behavior from abnormal behavior is that not all units are the same, e.g., no two units are the same. Normal is not well defined among all the units. For example, each unit (based on where it is located and its surroundings) has its own peculiar patterns and behavior and is unique and not comparable to other units. Each refrigeration unit may be configured with a different operating temperature range; Defrost cycles for a refrigerator may run at a different interval than another one. Such observation shows that what may be indicative of failure in one unit may be normal for another. This makes machine learning, which relies on pattern matching, very difficult. For example, there may be no baseline for all units, which makes it difficult to train a model using data from an "ideal" refrigerator that always operates normally.

Automated machine learning or automated artificial intelligence can be described as the process of automating the tasks for building and training machine learning models. The process can include feature engineering and selection, choosing the type of machine learning algorithm, building an analytical model based on the algorithm, model training and hyperparameter optimization, and running the model to generate scores and findings.

To improve machine learning, for example, automated machine learning, a technique is presented, which can enable automated feature engineering in an unsupervised manner, for example, where features are not dependent on absolute values of the underlying data source or business knowledge, which can create features map to enable any anomaly detection algorithms, and/or which can allow feature evaluation metrics based on custom inputs. Such improved machine learning can perform anomaly detection. The technique includes preparing data for modeling by performing automated feature engineering. The technique allows for automatically creating features or automated feature engineering, for streaming data or automated data, accounting for non-homogenous nature of data and its continual variations. The technique can include converting streaming data into point statistics, without necessarily being aware of the context of the streaming data. The technique can allow for a machine learning model to be able to detect abnormalities before a failure event occurs. The technique can include a dynamic time warping to enable anomaly detection algorithm.

The feature engineering technique can be incorporated in an end-to-end system that performs feature engineering on any streaming datasets, e.g., which are sourced from IoT sensors or have time lapsed or continuous streams of datasets. Such an end-to-end system can start from dynamic streaming data and convert it to point statistics in a context-unaware manner to enable unsupervised anomaly detection. The technique need not be aware of the type of streaming data, for example, can work on any streaming data such that a business context can be missing, or need not be required. This can make the whole process more efficient and cross-applicable. For instance, while an example was given related to temperature sensors in a refrigeration unit, the technique can work for coolers and ovens, humidity sensors, voltage sensors, and/or others. The technique can adapt to any streaming data, for example, to detect anomalies. The technique in an aspect can convert temporal data or streaming data to point statistics based feature set, for example, to enable anomaly detection algorithms such as one-class support vector machine (SVM) and isolation forests.

Generally, a technique of feature engineering can include the following aspects in an embodiment.

1. Use a dynamic series of data and run over the long-term parameter to calculate the point stats such as, but not limited to, mean, mode, median, standard deviation, and/or others.

2. A quantized version of the fluctuations is created with t1, t2, as time interval. This can be as high as a few hours or as low as a few seconds depending on time frequency of the streaming data. It is possible to run a greedy search algorithm to try minimum instance (e.g., 15 minutes if that is the time frequency at which sensor readings are received) and iteratively increase the time interval in the 2n manner (30 minutes, 1 hour, 2 hours, 4 hours, 8 hours, and so on). The point stats or statistics such as, but not limited to, mean, mode, median, standard deviation, and/or others are calculated at each of those intervals. Such an interval is also referred to as short-term series or strata in this disclosure.

3. A job is now to identify "normal" fluctuations from the "abnormal" ones. This can be done in three steps. First, the long-term series as well as short-term series are normalized using a normalization technique such as percentage difference. Other normalization techniques may also be used in this step, such as min-max feature scaling, Z-score (also known as standard score), and/or others. In the second step, Dynamic Time Warping (DTW) algorithm is applied to a normalized long-term series, and a short-term series normalized using the same normalization technique as the long-term series. DTW is used in this step because the long-term and short-term series have different number of points and time spans. In the third step, probability distribution of two series is plotted for each pair of long-term and short-term series to which DTW is applied in step 2.

4. The probability distributions for continuously variable function in the third step described above can take multi-modal distribution form. Also, the distribution can be Leptokurtic (positive kurtosis) with most of the values located in the tails of the distribution rather than around the mean. The technique takes the distance between two means as an indication of subtle changes which are not normal fluctuations. In case of normal fluctuations the distance function can be overlapping whereas in case of abnormal fluctuations the distance function can be farther part. The mean, mode, and/or median of two distributions create the feature which can identify the solution.

5. Features learnt thereby identify the behavior of dynamic data by converting it into a point statistics. Features engineered from these steps are then fed to anomaly detection algorithms like isolation forest, one class SVM, or another.

FIG. 2 is a flow diagram illustrating a method in an embodiment. The method can perform feature engineering, for example, extract features from raw data, which can be used in a machine learning model to train a model and identify anomalies in streaming data in a time series or temporal manner. At 202, incoming data streams can be collected in a time series or temporal manner. For example, data streams can be received from IoT sensors. Data streams can include both normal and abnormal events. For example, datasets can be collected at streaming interval t1 and which is known apriori. The data streams can include streaming data, for example, received from a sensor, and representing at least one attribute detected over time, such as, but not limited to, temperature data of a refrigeration unit over time or a period of time.

Figure 3:
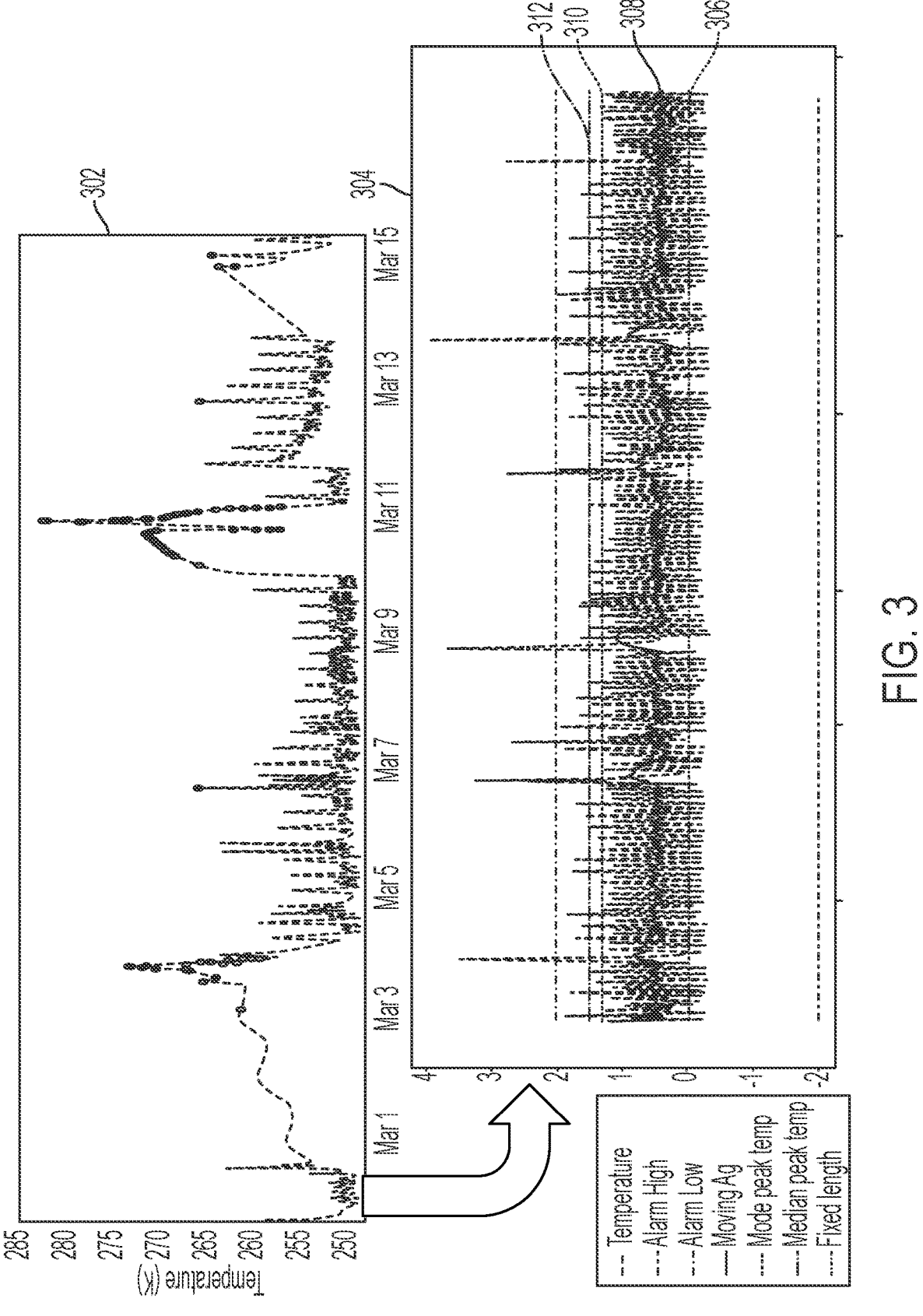
FIG. 3 shows a graphical example of streaming data converted to long term point statistics in an embodiment.

At 204, the method can include computing or calculating long term statistics, for example, by calculating one or more of long term fixed and/or moving mean, mode, median, standard deviation and so on. For instance, for the long running sequence or the streaming data, the long term average for point statistics, e.g., simple (long_sa) and moving average (long_ma), is calculated. Simple average refers to a fixed average. Long term point statistics can be computed for streaming data of a time period or duration, referred to as a first time duration. FIG. 3 shows a graphical example of streaming data 302 converted to long term point statistics 304. The x-axis represents time, and the y-axis represents data value (e.g., at 302 y-axis can represent absolute value, at 304 y-axis can represent scaled value). For instance, incoming data stream is graphically shown at 302; the incoming data that is converted to point statistics is shown at 304. The point statistics can include fixed average 306, moving average 308, mode 310, median 312, standard deviation, and/or others.

Figure 4:
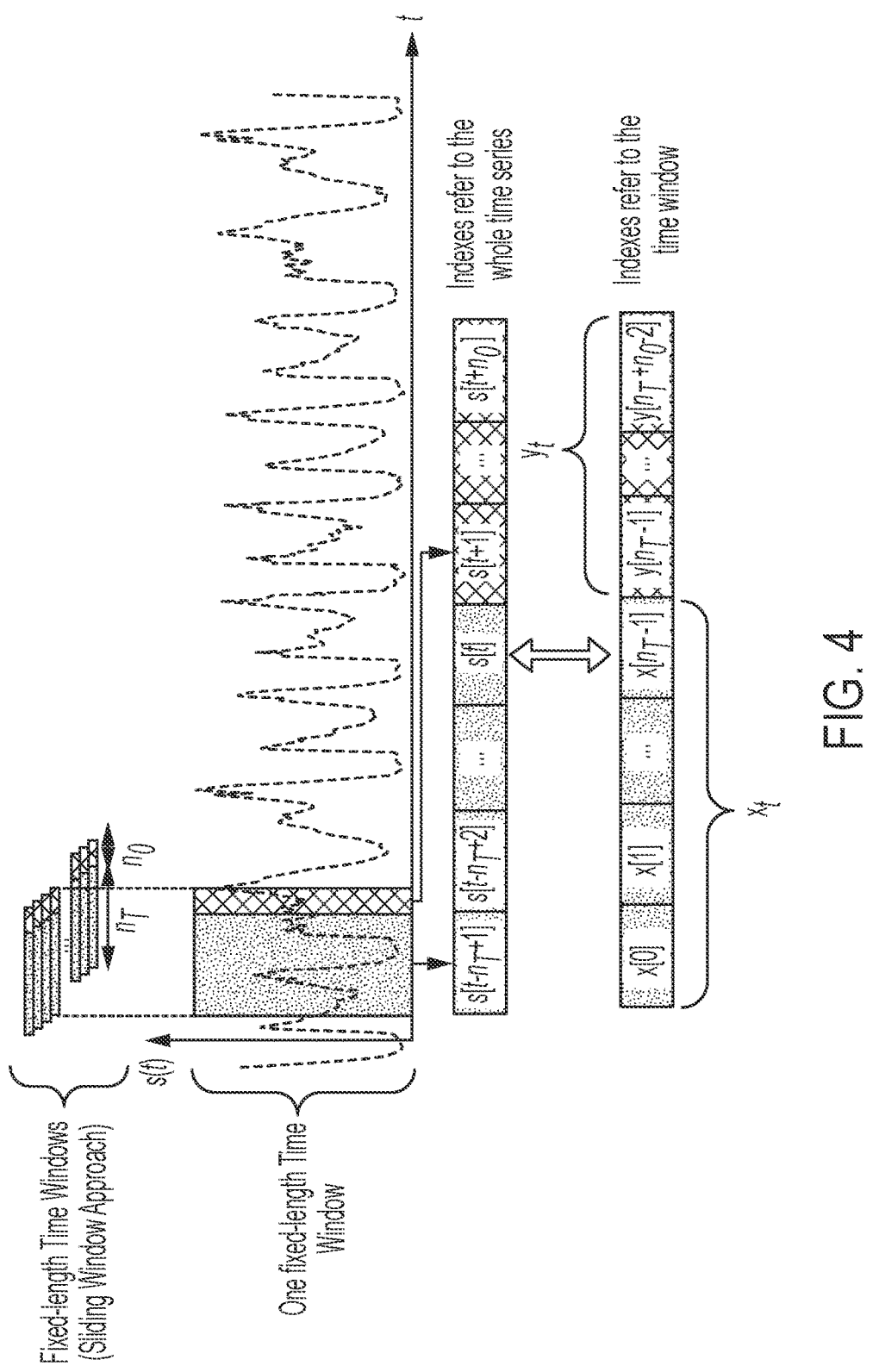
FIG. 4 shows an example of window intervals in an embodiment.

At 206, the streaming data can be quantized into intervals of time windows. The intervals of time windows can be of shorter time duration than the first time duration; hence the terms "long term" and "short term". For instance, if "long term" refers to a time duration, then "short term" refers to duration less that that time duration. Short term point statistics can be computed based on the quantized intervals. A window function can be used to get intervals, e.g., time window intervals. Multiple of those intervals can be used to quantize the sequence or streaming data. For example, a plot of the sequence (e.g., the streaming data) is quantized into the interval in the multiple of the minimum window function. FIG. 4 shows an example of window intervals in an embodiment. If minimum window includes t1=15 minutes, then t2=30 minutes can be defined, and then t4 and t8 and t16, t32, and so on, can also be defined. Additionally, when time is available, 24 hour window is taken as baseline for streaming patterns. It can represent t{x} sequence in terms of lowest quantum. For example, t96 can be the maximum in the above example case. Multiple such strata of quantized versions are collected, for example t{96} day1=s1, and so on. For example, multiple widths of time windows using the 2n approach or another approach can be used. Strata here refers to short-term intervals, for example, 1 hour, 2 hours, 4 hours, 8 hours, etc. The terms "minimum window" and "lowest quantum" have the same meaning, as used herein. For example, an example of a minimum window or lowest quantum can be the 15 minute interval at which IoT sensor readings are received, in this example. In such an example, a stratum can have 2 readings and span 30 minutes, another stratum can have 4 readings and span 15×4=60 minutes, yet another stratum can have 8 readings and span 15×8=120 minutes, i.e., 2 hours, and so on. In case of 24 hours stratum, there will be 96 readings.

The method can collect quantized versions of such patterns, which contain the sequence of various strata for a period of time, for example, across various days or months or instances, and calculate the point statistics for each strata, for example, s1, s2, and so on. The point statistics can include moving averages, like mean, mode, median, standard deviation, and so on.

Figure 5:
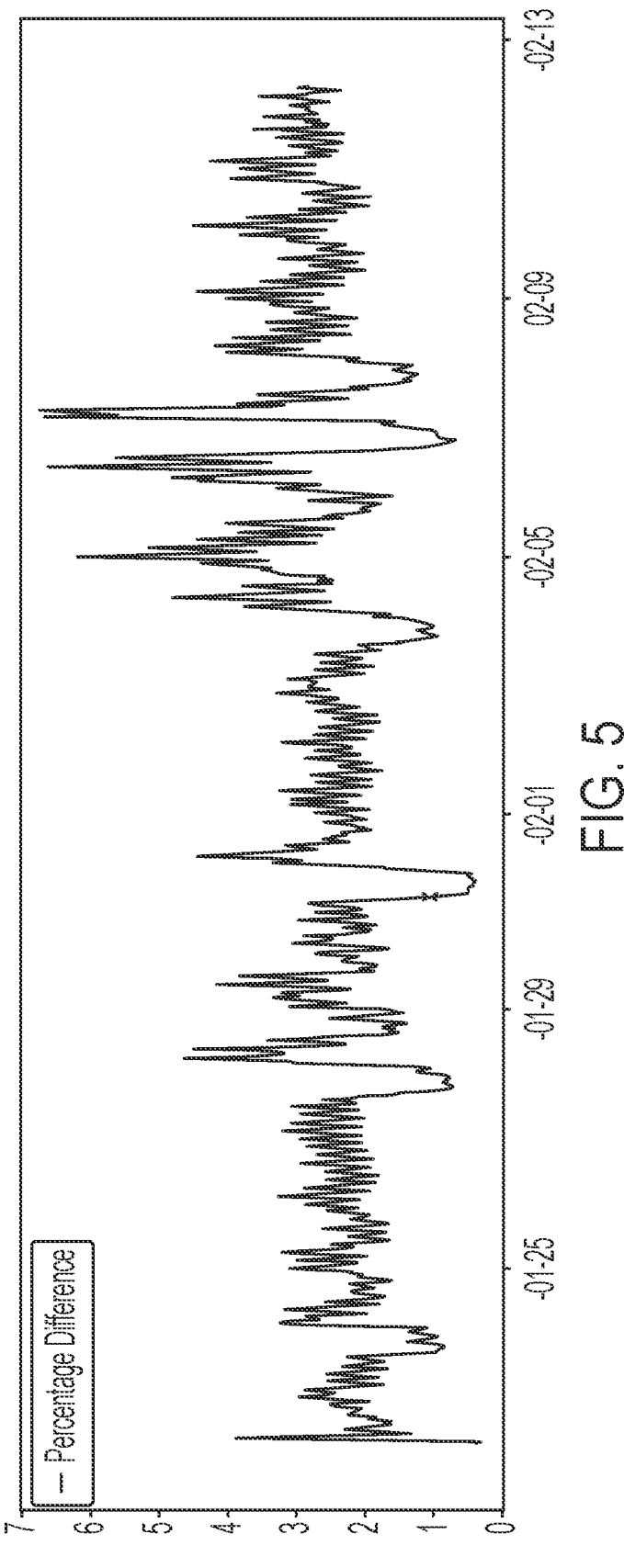
FIG. 5 is an example graph showing the percentage difference between long term and short term point statistics in an embodiment.

At 208, the method can include normalizing the long term and short term strata points or point statistics. In an embodiment, normalization can be done by calculating the percentage differences for the long term and short term strata points or point statistics. For example, the long term point statistics were determined at 204, and at 206, the method by using the window function, identified the strata and calculated the short term point statistics. Percentage differences plots can be created for the long term and short term strata points or point statistics. Percentage difference is a normalization technique using the formula (<Actual Value>−<Average Value>)/<Average Value>. These are referred to as "Diff Plots". The process can be repeated across the different windows, and multiple such patterns can be plotted. FIG. 5 is an example graph showing a Diff Plot. In addition to percentage differences, other normalization techniques may also be used in this process, such as min-max feature scaling. Z-score (also known as standard score), and/or others.

Figure 6:
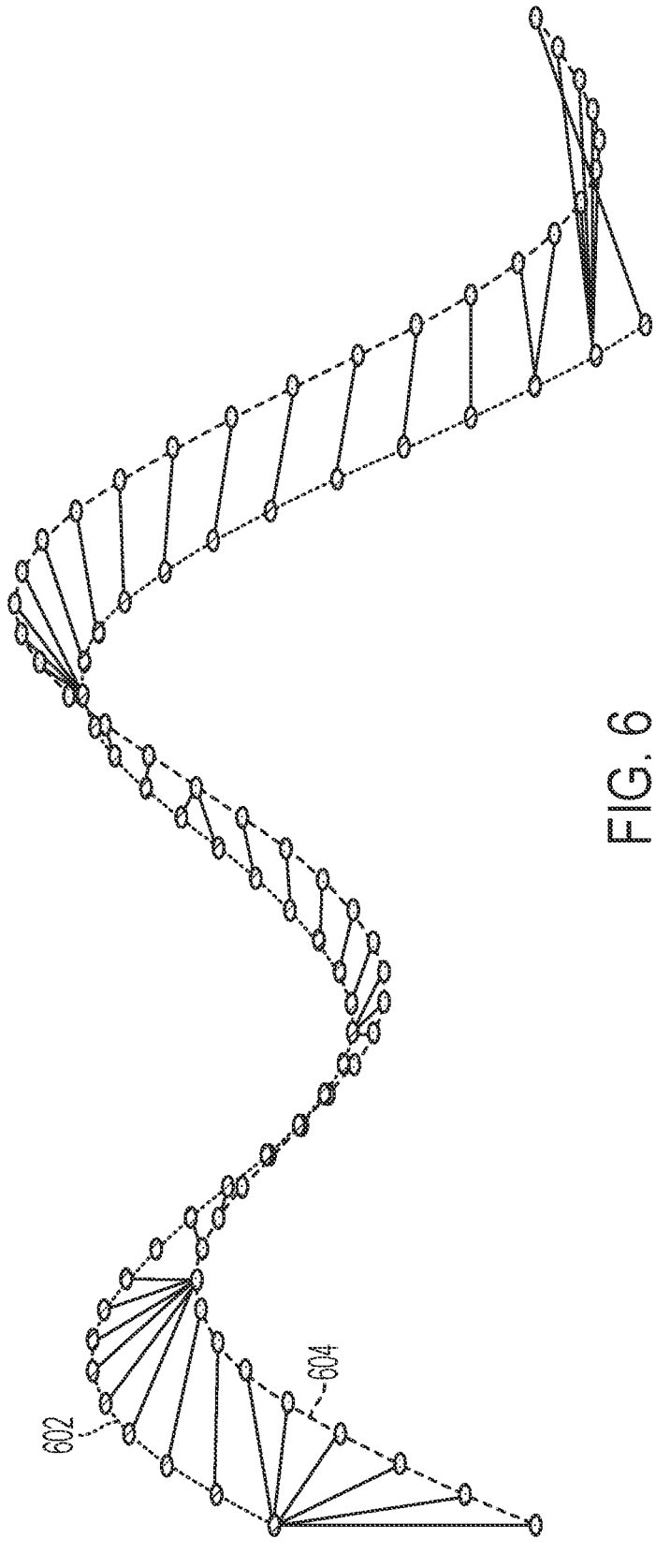
FIG. 6 shows dynamic time warping for stratas in an embodiment.

At 210, the method can include applying dynamic time warping (DTW). For example, dynamic time warping (DTW) can be applied across long-term diff plot and each of the short-term diff plots. For example, dynamic time warping can be applied across the percentage differences determined for the long term point statistics and the short term point statistics. Briefly dynamic time warping (DTW) is an algorithm that measures similarity between two temporal sequences, which temporal sequences may vary in speed. For each pair of series between the long term statistics Diff Plot and generated Diff Plot from strata with window function and point statistics, the method applies the DTW to calculate the similarity or in other words difference between the two series. In an embodiment, input to a given DTW is a long-term diff plot for a given point statistics and one of the short-term diff-plots for various strata for that particular point statistics. Percentage difference computed at 208 helps normalize long-term series and short-term strata series for a given point statistics and makes them usable in this DTW processing. FIG. 6 shows dynamic time warping for strata in an embodiment. By way of example, one of the two data series 602 can represent a diff plot series for a long-term point stat; the other of the two data series 604 can represent one of the diff-plot series, for example, out of various short-term strata, for that particular point stat.

Unlike traditional dynamic time warping, which compares multiple different time series, in this case dynamic time warping compares multiple clones of the same time series across the various quantum of time.

The warping function w is not constant in this case, as the method goes back in time to compare the warping path. In an aspect, the technique does not follow monotocity condition in strict sense and goes back in time to compare the warping path. In the below formula, i can represent a data of a long-term point stat; j can represent data of short-term strata point stat, t can represent a time step or time point.

$$i_{t-1} \le i_t \text{ and } j_{t-1} \le j_t$$

Figure 7:
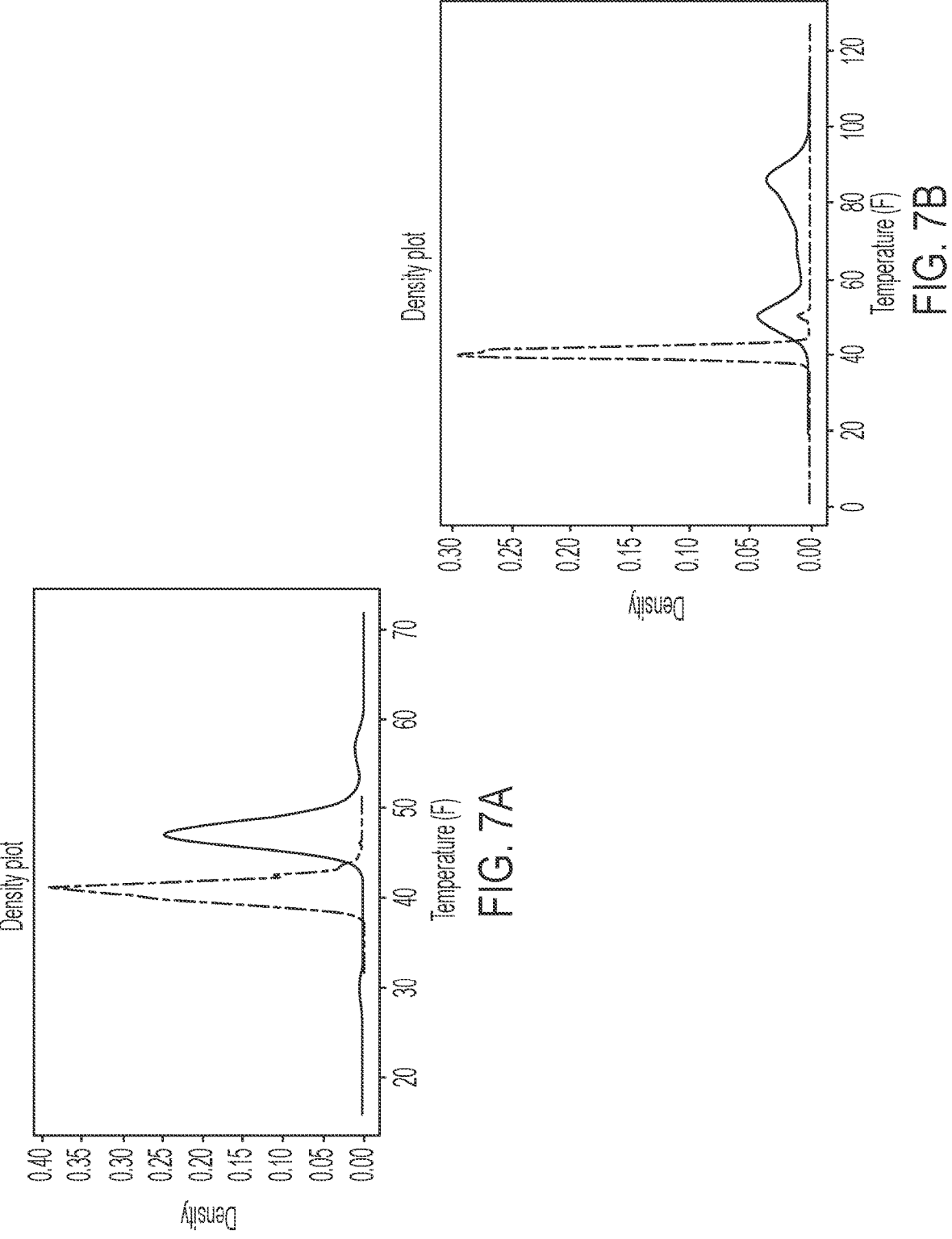
FIGS. 7A and 7B illustrate examples of the probability distribution in an embodiment.

At 214, probability distribution can be generated or plotted, for the two series in each of the DTW at 210. For instance, a pair of probability distributions of the dynamic time warped percentage differences of the long term point statistics and the short term point statistics, can be generated and/or plotted. Distance between the means of these two probability distributions allows the method to decide normality versus abnormality: greater the distance more the abnormality. A threshold distance can be configured, and the data with distance greater than the threshold distance can be determined as being not in the normal range (abnormal). This plotting or generating of the probability distribution also allows the method to identify the strata of interest, that is the time-windows that are likely to reveal abnormality. FIGS. 7A and 7B illustrate examples of the probability distribution for the two series, e.g., long term point stat and short term point stat. In the cases where the fluctuations in temperature are "typical" (e.g., in case of normal behavior), the distance between the two peaks are lower (lesser) or even non-existent, for example, as shown in FIG. 7A; when the distance is larger, or even has multiple modes, as shown in FIG. 7B, then it is indicative of an unusual event or abnormal behavior, which can be quantified. In the example shown in FIG. 7A, it can be seen that peaks are overlapping with sensor reading. In the example shown in FIG. 7B, the probability distribution shows multiple modes which are running much farther from normal.

The data or plot of FIGS. 7A and 7B can serve as the objective function for an automated feature engineering process. The technique can discard the charts or data which show less distance d1 between two distributions while the technique can create features from the rest of stratas.

At 216, based on the probability distribution generated at 214, features which can be input to a machine learning algorithm can be captured or produced. For example, based on the distance between mean values of the pair of probability distributions, machine learning input features can be identified or produced. For instance, the above processed point statistics for the differences that are produced are then captured in the form of various features, which are used to identify normal versus abnormal behavior. Features, for example, are what are fed into a machine learning model and created from raw data. Normal versus abnormal strata are identified in such a manner. For instance, since the above processing has established how to differentiate normal fluctuations from abnormal ones (using the probability distributions as described above), point statistics such as mean, mode, median, standard deviation, z-score etc. of the two series mentioned above, are captured in the form of various features. DTW distances between the two series may also be used for feature engineering.

The features that such a process can produce can include the following.

avg_temp=simple average of temperature for the entire unit
    avg_peak_temp=average of all the peaks (tall and short peaks) for the unit
    moving_avg=for a window of 4 hours shown here but parametrized in the function
    2 sd=upper 2 standard deviation (sd) limit for the moving average
    sd_ma=standard deviation (std dev) of the moving avg
    sd_fa=standard deviation (std dev) of the fixed av
    z_value_ma=z value for the moving average
    z_value_fa=z value for the fixed average
    mode_peak_temp=mode of defrost cycle peaks after rounding off
    median_peak_temp=median of defrost cycle peaks
    per_diff=percentage difference between median_peak-_temp and moving_avg
    w1—warping path distance length Once the features are extracted, the technique can then feed one or more anomaly detection algorithms, for example, unsupervised anomaly detection algorithms, which work on the point statistics of the features. Examples of such modeling algorithms can include, but not limited to, isolated forest, extended isolation forest, one class SVM, one class SVM (stochastic gradient descent (SGD)). The technique need not be focused on a specific algorithm as such a process can work by comparing multiple algorithms and giving best results by comparing it to manually supplied truth set. For example, at 218, the produced features (also referred to as machine learning input features) can be input to a machine learning algorithm, to train a machine learning model, where the trained machine learning can detect anomalies in streaming data, given newly produced features in inference phase. For instance, at 218, the machine learning input features can be fed to train a machine learning model for the machine learning model to detect anomalies in data streams such as incoming data streams.

The technique can detect actual events before they happen, and also by analyzing the sensor data streams, can spot the pattern of abnormality before an actual event and act as an early warning system.

Figure 8:
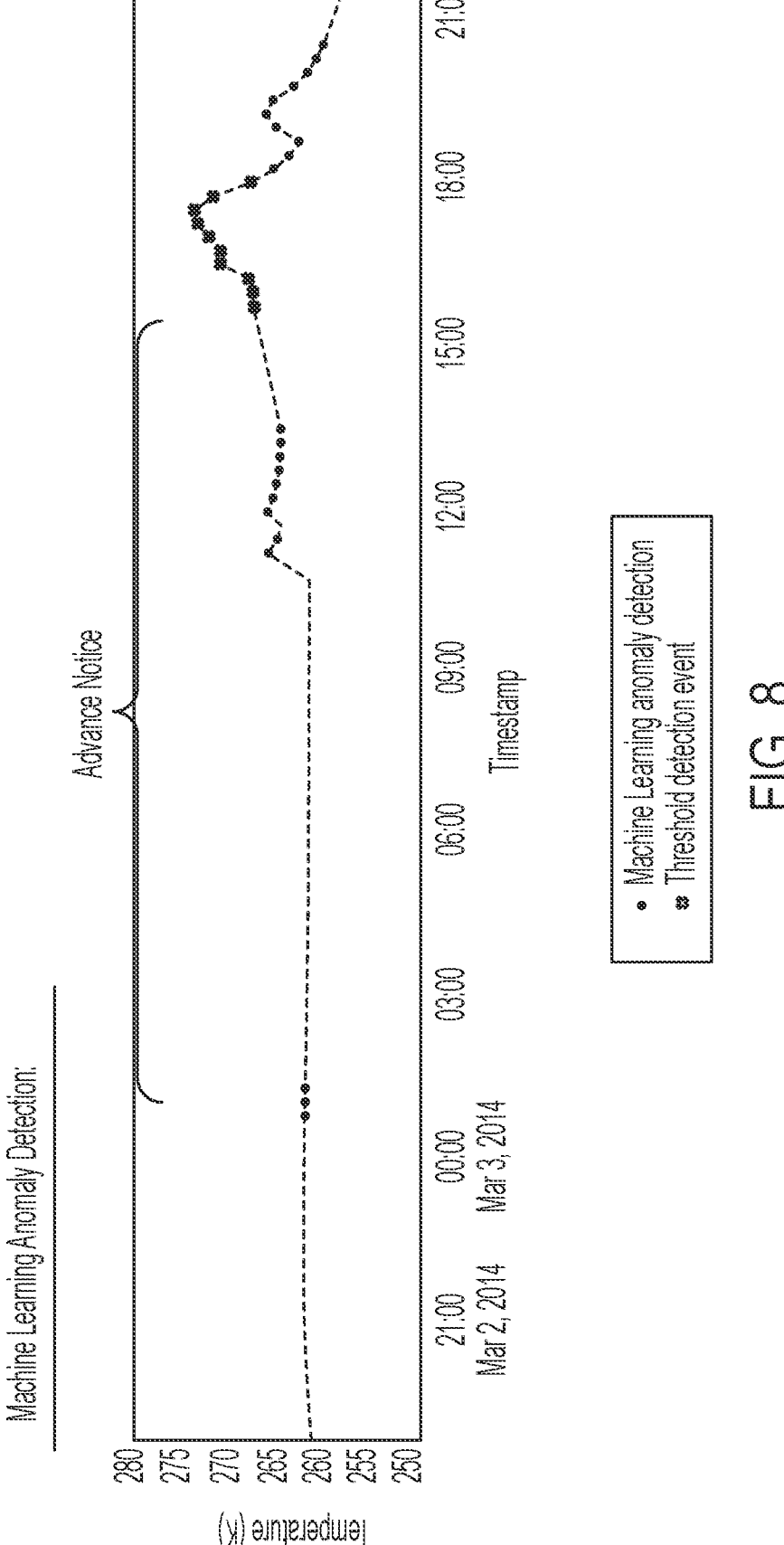
FIG. 8 shows an example plot where the machine learning anomaly detection described above detected anomaly in advance of the occurrence of the anomaly in an embodiment.

FIG. 8 shows an example plot where the machine learning anomaly detection described above detected anomaly in advance of the occurrence of the anomaly in an embodiment. For example, the points shown by the circle symbol represent the time points when the machine learning anomaly detection provide advance notice of anomaly. The points shown by Xs represent time points when critical event or threshold detection occurred in an equipment being monitored.

Figure 9:
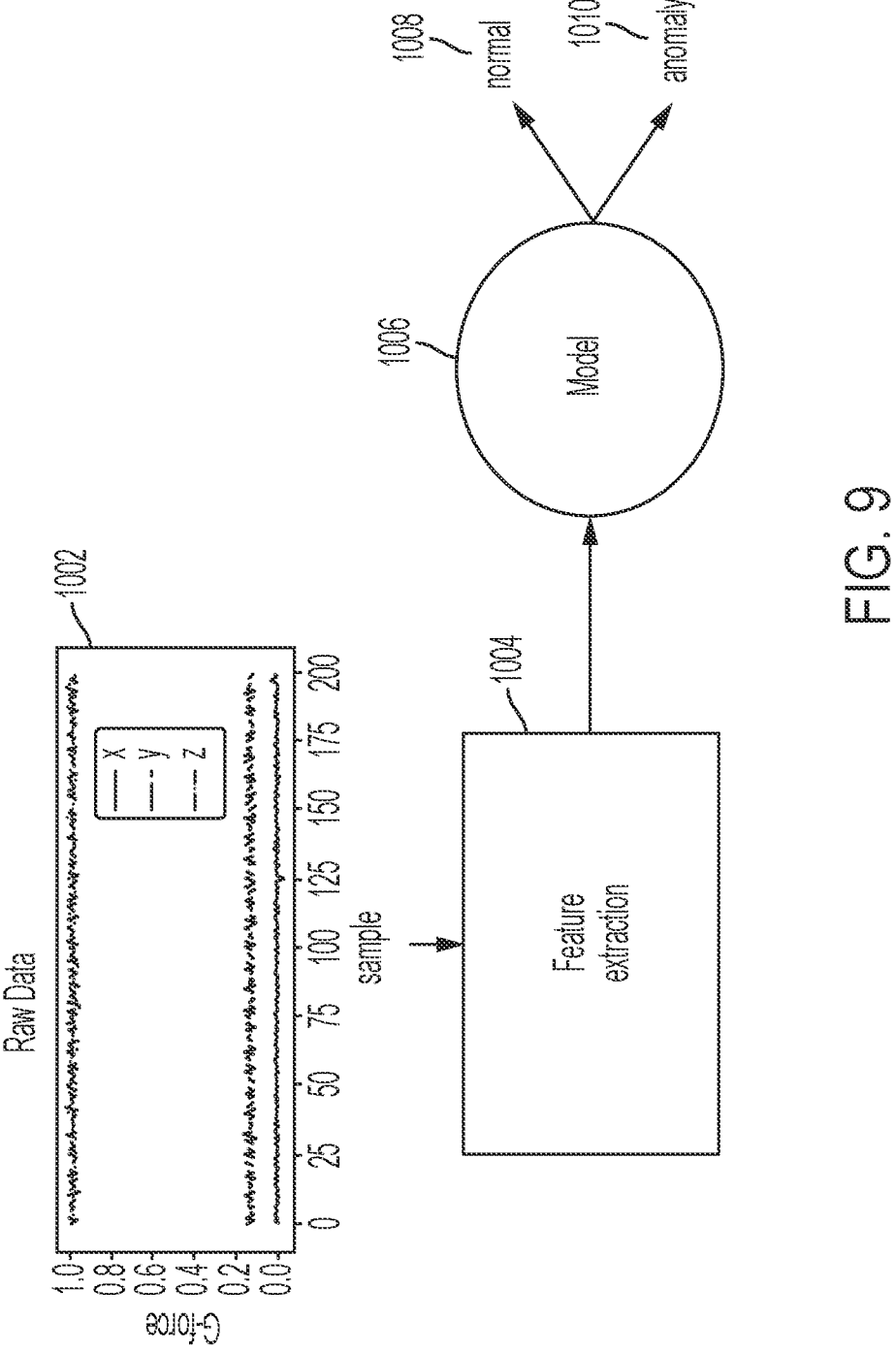
FIG. 9 shows a block diagram of machine learning anomaly detection components in an embodiment.

FIG. 9 shows a block diagram of machine learning anomaly detection components in an embodiment. The components can be implemented, for example, by or on a computer system or environment such as the one described above with reference to FIG. 1. Raw data 1002, for example, streaming data from one or more sensors, for example, connected via Internet of Things (IoT) can be received at feature extraction 1004. Feature extraction 1004 can include subcomponents, for example, computer-implemented functions and/or modules, which can perform the feature extraction described above, for example, with reference to FIG. 2. The features produced by feature extraction 1004 are input or fed to train a machine learning model 1006 that uses an unsupervised anomaly detection algorithm. The machine learning model 1006 predicts or classifies the fluctuations in temporal data as being normal 1008 or anomalous 1010.

Generally, systems, methods and techniques in one or more embodiments can include the following processing. Various point statistics for the long-term series can be calculated. Various point statistics for various short-term series (also referred to as strata) can be calculated. A normalization technique for the various point statistics for the long-term series as well as short-term series can be implemented and/or run to create diff plots. An example of a normalization technique can include percentage difference. Other normalization techniques may also be used, such as min-max feature scaling. Z-score (also known as standard score), and/or others. DTW can be used or applied for each pair of a) diff plot series for a given long-term point statistic and b) one of the diff-plot series, out of various short-term strata, for that particular point statistic. A pair of probability distributions for the two series in each of the DTW can be plotted. Distance between the means of these two probability distributions helps to decide normality versus abnormality: e.g., greater the distance, the more the abnormality. Based on this distance also, the strata of interest can be identified; that is, the time-windows that are likely to reveal abnormality can be identified as the strata of interest. In this way, normal fluctuations from abnormal ones can be differentiated (e.g., those with greater distance or distance above a threshold distance value can be identified as abnormal), and point statistics such as mean, mode, median, standard deviation, z-score etc. of the two series mentioned above, can be captured in the form of various features. DTW distances between the two series may also be used for feature engineering. Features engineered can then be fed to anomaly detection algorithms like isolation forest or one class SVM, and/or other anomaly detection algorithms.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
  receiving streaming data representing at least one attribute detected by a sensor over time;
  computing long term point statistics associated with the streaming data of a first time duration;
  quantizing the streaming data into intervals of time windows, the intervals of time windows being of shorter time duration than the first time duration, and computing short term point statistics based on the intervals of time windows;
  normalizing the long term point statistics and the short term point statistics;
  applying dynamic time warping across the normalized long term point statistics and the short term point statistics;
  generating a pair of probability distributions of the dynamic time warped normalized long term point statistics and the short term point statistics;
  based on distance between mean values of the pair of probability distributions, producing machine learning input features, the input features comprising statistics representations processed from raw data, wherein the input features are learned in an unsupervised manner; and
  feeding the machine learning input features to train a machine learning model for the machine learning model to detect anomalies in data streams before a failure event occurs to prevent the failure event,
  wherein the machine learning model includes unsupervised anomaly detection model.

2. The method of claim 1, wherein the normalizing the long term point statistics and the short term point statistics includes determining percentage differences for the long term point statistics and the short term point statistics,
  wherein the applying dynamic time warping includes applying dynamic time warping across the percentage differences determined for the long term point statistics and the short term point statistics, and
  wherein the generating a pair of probability distributions includes generating a pair of probability distributions of the dynamic time warped percentage differences of the long term point statistics and the short term point statistics.

3. The method of claim 1, wherein the long term point statistics include at least one selected from the group consisting of mean, median, mode, and standard deviation.

4. The method of claim 1, wherein the short term point statistics includes at least one selected from the group consisting of mean, median, mode, and standard deviation.

5. The method of claim 1, wherein the machine learning model includes a model implementing an unsupervised machine learning algorithm.

6. The method of claim 5, wherein the unsupervised machine learning algorithm includes at least one selected from the group consisting of isolated forest, extended isolation forest, one class support vector machine (SVM), one class SVM (stochastic gradient descent (SGD)).

7. The method of claim 1, wherein the machine learning input features include at least one selected from the group consisting of fixed average, moving average, standard deviation for fixed average, standard deviation for moving average, z value for moving average, z value for fixed average, mode, median, percentage difference between median and moving average, warping path distance length.

8. A system comprising:
  at least one processor; and
  at least one memory device coupled with the at least one processor;
  the at least one processor configured to at least:
    receive streaming data representing at least one attribute detected by a sensor over time;
    compute long term point statistics associated with the streaming data of a first time duration;
    quantize the streaming data into intervals of time windows, the intervals of time windows being of shorter time duration than the first time duration, and compute short term point statistics based on the intervals of time windows;
    normalize the long term point statistics and the short term point statistics;
    apply dynamic time warping across the normalized long term point statistics and the short term point statistics;
    generate a pair of probability distributions of the dynamic time warped normalized long term point statistics and the short term point statistics;
    based on distance between mean values of the pair of probability distributions, produce machine learning input features, the input features comprising statistics representations processed from raw data, wherein the input features are learned in an unsupervised manner; and
    feed the machine learning input features to train a machine learning model for the machine learning model to detect anomaly in data streams before a failure event occurs to prevent the failure event,
    wherein the machine learning model includes unsupervised anomaly detection model.

9. The system of claim 8, wherein the at least one processor configured to:
  determine percentage differences for the long term point statistics and the short term point statistics, in normalizing the long term point statistics and the short term point statistics;
  apply dynamic time warping across the percentage differences determined for the long term point statistics and the short term point statistics, in applying dynamic time warping; and
  generate a pair of probability distributions of the dynamic time warped percentage differences of the long term point statistics and the short term point statistics, in generating a pair of probability distributions.

10. The system of claim 8, wherein the long term point statistics include at least one selected from the group consisting of mean, median, mode, and standard deviation.

11. The system of claim 8, wherein the short term point statistics includes at least one selected from the group consisting of mean, median, mode, and standard deviation.

12. The system of claim 8, wherein the machine learning model includes a model implementing an unsupervised machine learning algorithm.

13. The system of claim 8, wherein the machine learning input features include at least one selected from the group consisting of fixed average, moving average, standard deviation for fixed average, standard deviation for moving average, z value for moving average, z value for fixed average, mode, median, percentage difference between median and moving average, warping path distance length.

14. A computer program product comprising a computer readable storage medium having program instructions embodied therewith, the program instructions readable by a device to cause the device to:

receive streaming data representing at least one attribute detected by a sensor over time;

compute long term point statistics associated with the streaming data of a first time duration;

quantize the streaming data into intervals of time windows, the intervals of time windows being of shorter time duration than the first time duration, and compute short term point statistics based on the intervals of time windows;

determine percentage differences for the long term point statistics and the short term point statistics;

apply dynamic time warping across the percentage differences determined for the long term point statistics and the short term point statistics;

generate a pair of probability distributions of the dynamic time warped percentage differences of the long term point statistics and the short term point statistics;

based on distance between mean values of the probability distributions, produce machine learning input features, the input features comprising statistics representations processed from raw data, wherein the input features are learned in an unsupervised manner; and feed the machine learning input features to train a machine learning model for the machine learning model to detect anomaly in data streams before a failure event occurs to prevent the failure event, wherein the machine learning model includes unsupervised anomaly detection model.

15. The computer program product of claim 14, wherein the device is caused to:

determine percentage differences for the long term point statistics and the short term point statistics, in normalizing the long term point statistics and the short term point statistics;

apply dynamic time warping across the percentage differences determined for the long term point statistics and the short term point statistics, in applying dynamic time warping; and generate a pair of probability distributions of the dynamic time warped percentage differences of the long term point statistics and the short term point statistics, in generating a pair of probability distributions.

16. The computer program product of claim 14, wherein the long term point statistics include at least one selected from the group consisting of mean, median, mode, and standard deviation.

17. The computer program product of claim 14, wherein the short term point statistics includes at least one selected from the group consisting of mean, median, mode, and standard deviation.

18. The computer program product of claim 14, wherein the machine learning model includes a model implementing unsupervised machine learning algorithm.

19. The computer program product of claim 14, wherein the machine learning input features include at least one selected from the group consisting of fixed average, moving average, standard deviation for fixed average, standard deviation for moving average, z value for moving average, z value for fixed average, mode, median, percentage difference between median and moving average, warping path distance length.

* * * * *